May 22, 1923.
1,456,197
H. A. TEDMAN
FUEL OIL CONTROL APPARATUS
Original Filed Feb. 11, 1921
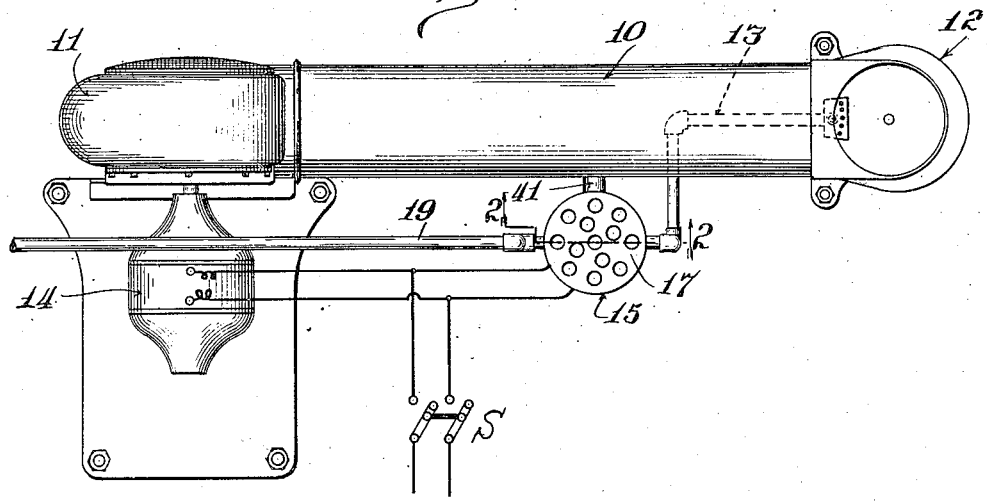
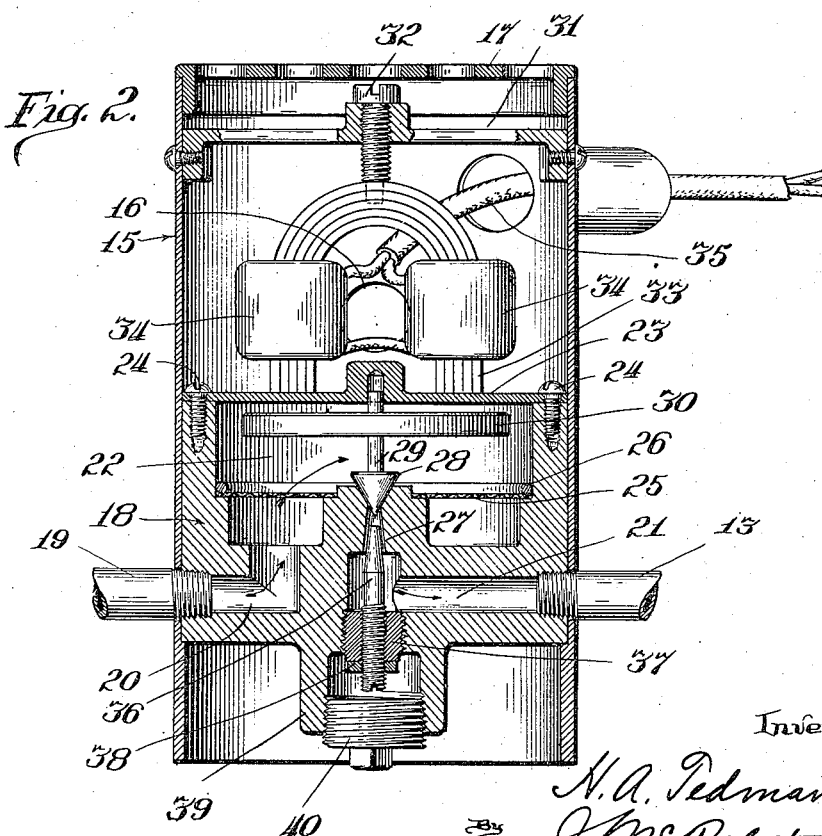

Patented May 22, 1923.

1,456,197

UNITED STATES PATENT OFFICE.

HUDSON A. TEDMAN, OF GALESBURG, ILLINOIS, ASSIGNOR TO WINSLOW BOILER & ENGINEERING COMPANY, OF CHICAGO, ILLINOIS, A CORPORATION OF ILLINOIS.

FUEL-OIL CONTROL APPARATUS.

Application filed February 11, 1921, Serial No. 444,136. Renewed March 15, 1923.

*To all whom it may concern:*

Be it known that I, HUDSON A. TEDMAN, a citizen of the United States, residing at Galesburg, in the county of Knox and State of Illinois, have invented certain new and useful Improvements in Fuel-Oil Control Apparatus, of which the following is a specification, reference being had therein to the accompanying drawing.

My invention relates to an apparatus for controlling the supply of fuel-oil to burners for boilers and furnaces of heating plants or systems, and consists in the matters hereinafter described and then pointed out in the appended claims.

In the drawings, Fig. 1 is a plan view of a portion of a heating plant comprising the present invention, and Fig. 2 is a sectional view on the line 2—2 of Fig. 1 showing the valve-case and valve mechanism.

In the drawings the reference numeral 10 indicates an air-duct connected at its intake end to an air blower 11, and at its outlet end to a fire pot or burner 12 to which fuel-oil is supplied by a fuel-pipe 13. The blower is driven by a motor 14, which is connected in a circuit from any suitable source of current, it being understood that this circuit may be controlled by a hand-switch or any means responsive to changes or variations in temperature in the building in which the plant is located.

An electrically operated valve is located in the oil-supply pipe-line and is operated simultaneously by the electric current that operates the motor, the parts being arranged so that the valve is held open to permit the flow of oil to the burner as long as the current passes to the motor and is closed to shut off the supply of oil when the motor stops.

The valve case 15 is supported conveniently near the air duct, being of any suitable size and cross section and preferably having an air port 16 to furnish air to the interior and a perforated cover plate 17 to provide ventilation. The valve body is formed by a cup-shaped block 18 located in one end of the case and screw threaded on opposite sides for the connection of the oil inlet pipe 19 and the outlet pipe 13 which pass through opposite sides of the case and respectively communicate with the inlet port 20 and the outlet port 21 formed in the lower portion of the block. The block is provided in its upper portion with a valve chamber 22 which is closed by a brass cover plate 23 attached at its periphery to the inner end of the block by screws 24 as shown. The inlet port 20 opens into the chamber, and the central portion of the block projects into the chamber a short distance to form an upward extension which is shouldered to receive a screen 25 which is held in place by a ring 26. The central extension of the block is provided with a passage 27 leading from the portion of the chamber above the screen into the outlet port 21, and the upper end of this passage is formed as a seat for the valve face 28 which is mounted on the stem 29. The cover 23 is provided with a guideway for the upper end of the valve stem, and a steel disk 30 is carried by the stem, being located a suitable distance below the cover so that the disk and valve may move up to open the oil passage. The upper end of the case forms a magnet chamber and is provided with a cross-bar 31 which carries a screw 32 by which a suitable laminated core 33 of an electromagnet is supported in place adjacent the cover 23. The core is energized by the coils 34 which are connected by the wires 35 to the motor 14. When the motor is operated the magnet is energized and the disk 30 is drawn up toward the cover to raise the valve face from its seat so that the oil will flow from the chamber 22 through the passage 27 to the outlet port. When the motor stops the magnet is deenergized and the disk and valve fall so that the latter closes the passage to the oil outlet port. By adjusting the position of the screw 32 and magnet core 33 proper pressure may be exerted on the cover plate 23 to flex or warp it slightly to prevent the disk 30 from chattering when current passes through the coils.

The arrangement of parts for synchronously driving the motor and energizing the magnet to open the valve may be varied, and for simplicity of organization I prefer to connect the magnet coils and the motor to the source of current through the switch S.

The passage 27 is provided with an adjustable needle valve 36 to regulate its area and the amount of oil passing through, this valve being carried in threaded engagement with a screw-bushing 37 entering a suitably threaded opening in the block. The valve 36 is held in position by a locknut 38, and its outer end is in a cup 39 that is closed by a plug 40 to prevent access to and tampering with the needle valve.

The valve face 28, its stem 29 and disk 30 are the only moving parts in the normal operation of the valve-mechanism, and all of these moving parts are in integral formation. The valve is opened simultaneously with the operation of the motor and remains open to allow oil to flow to the burner as long as the motor operates to supply the air necessary to form a combustible mixture, and when the motor stops the valve furnishes a positive cut-off for the oil. The supplies of oil and air necessary to produce a combustible mixture for fuel in the burner are synchronized. The parts of the valve are permanently enclosed in the case and are so set and adjusted that the operation is automatic, and they cannot be manipulated by the user and will not become inoperative or fail to deliver the proper amount of oil when the motor runs unless the user deliberately opens the case and interferes with the adjustment.

The ventilating port 16 and the perforated cover 17 allow circulation of outside air through the magnet chamber to keep the magnet cool, and the port is preferably connected to the air duct 10, as by means of a pipe 41, so that circulation of air to cool the magnet is assured by the draft through the duct which sucks outside air through the magnet chamber.

I claim:

1. In a device of the class described, a fuel-oil burner, a fuel-oil pipe line, an air-blower to deliver air to the burner, an electric motor for the air-blower, and an electrically operated valve normally closing the pipe line and in circuit with the motor while the motor is operating, whereby the supplies of air and oil to the burner are synchronously controlled.

2. In a device of the class described, a fuel-oil burner, a fuel-oil pipe line, an air-blower to deliver air to the burner, an electric motor for the air-blower, a valve normally closing the pipe line, a magnet to open the valve, and means for synchronously energizing and deenergizing the magnet and motor.

3. In a device of the class described, a fuel-oil burner, a fuel-oil pipe line, an air-blower to deliver air to the burner, an electric motor for the air-blower, a valve in the pipe line comprising a chamber having inlet and outlet ports communicating with said pipe line and connected by an oil passage, and a valve face normally closing said passage and having a metallic disk, an electro-magnet adapted when energized to move the disk to open the passage, and means for synchronously energizing and deenergizing the magnet and motor while the motor is operating.

4. In a device of the class described, a fuel-oil burner, a fuel-oil pipe line, an air-blower having a duct to deliver air to the burner, an electric motor for the air-blower, a casing having an air-port communicating with the air-duct and a perforated cover, a valve in the casing normally closing the pipe line, and a magnet in the casing adjacent the air-port and in circuit with the motor to open the valve.

5. In a device of the class described, a fuel-oil burner, a fuel-oil pipe line, an air-blower to deliver air to the burner, an electric motor for the air-blower, an oil valve in the pipe line comprising a case, a metal plate dividing the case into upper and lower chambers, the latter chamber having inlet and outlet ports communicating with said pipe line and connected by an oil-passage, and a valve face normally closing said passage and having a metallic disk, an electro-magnet in the upper chamber adapted when energized to move the disk to open the passage, and means for synchronously energizing and deenergizing the magnet and motor.

6. In a device of the class described, a fuel-oil burner, a fuel-oil pipe line, an air-blower to deliver air to the burner, an electric motor for the air-blower, an oil valve in the pipe line comprising a case, a metal plate dividing the case into upper and lower chambers, the latter chamber having inlet and outlet ports communicating with said pipe line and connected by an oil passage, an adjustable valve to regulate the area of said passage, a valve face normally closing said passage and having a metallic disk, a cross-bar in the upper chamber, a screw in the bar, an electro-magnet carried by the screw adjacent the dividing plate and adapted when energized to move the disk to open the passage, and means for synchronously energizing and deenergizing the magnet and motor.

HUDSON A. TEDMAN.